United States Patent [19]
Bechtel

[11] 3,926,052
[45] Dec. 16, 1975

[54] RELATIVE HUMIDITY COMPUTER

[75] Inventor: Jon Harold Bechtel, Goshen, Ind.

[73] Assignee: Johnson Service Company, Milwaukee, Wis.

[22] Filed: May 6, 1974

[21] Appl. No.: 466,977

[52] U.S. Cl. .............................. 73/336.5; 73/17 A
[51] Int. Cl.² ....................................... G01N 25/02
[58] Field of Search ........ 73/17 A, 335, 336.5, 336, 73/170 R

[56] References Cited
UNITED STATES PATENTS

| | | | |
|---|---|---|---|
| 2,873,607 | 2/1959 | Kuyk | 73/335 |
| 3,810,389 | 5/1974 | Jason | 73/336.5 |
| 3,820,398 | 6/1974 | Rekai | 73/336.5 |

Primary Examiner—Donald O. Woodiel
Attorney, Agent, or Firm—Johnson, Dienner, Emrich & Wagner

[57] ABSTRACT

Apparatus for measuring relative humidity within a given environment includes first and second operational amplifiers connected in a positive feedback loop. The first amplifier supplies an input signal to the second amplifier enabling the second amplifier to provide an amplified output signal which is fed back to an input of the first amplifier. First and second thermistors, which sense dewpoint and ambient temperatures, respectively, within the environment, control the gain of the second amplifier in accordance with changes in relative humidity to permit the second amplifier to provide an output signal which varies linearly with percent relative humidity.

16 Claims, 4 Drawing Figures

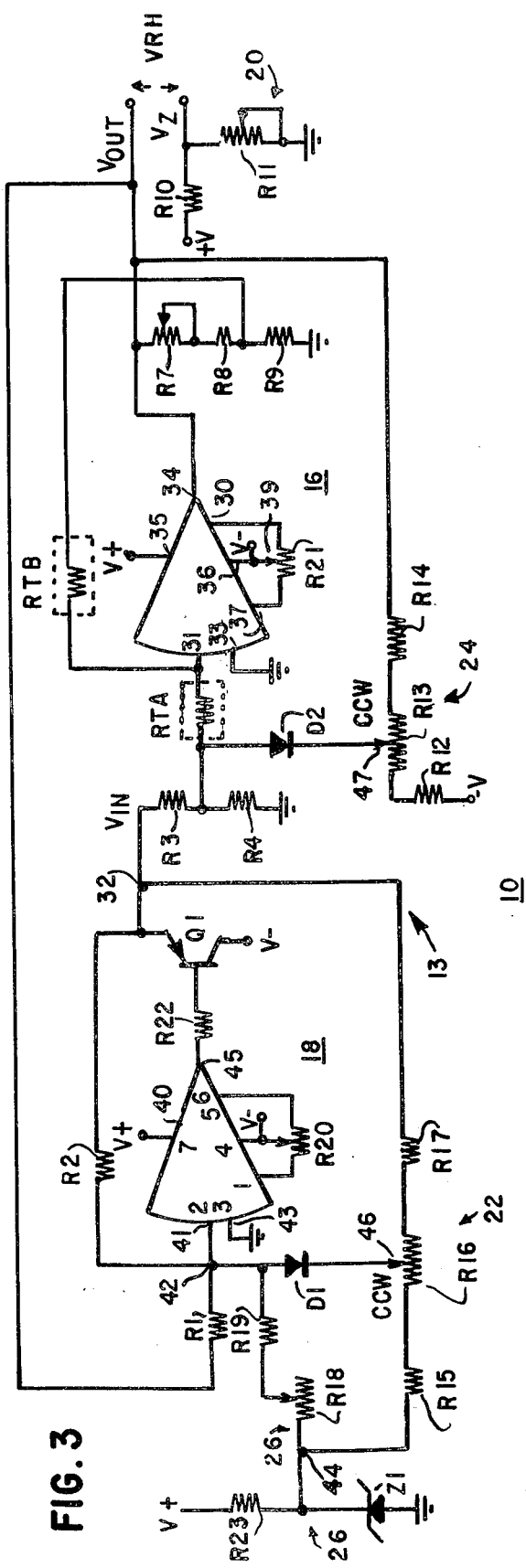

RELATIVE HUMIDITY COMPUTER

BACKGROUND OF THE INVENTION

1. Field of the Invention

This invention relates to relative humidity measuring apparatus, and more particularly, to apparatus for providing a linear voltage output that is proportional to per cent relative humidty.

2. Description of the Prior Art

For the control of and readout of conditions of a given environment, such as relative humidity, it is often desirable, if not necessary, to employ apparatus which reads out directly in a signal linear with per cent relative humidity. One known method for measuring per cent relative humidity involves the use of optical dewpoint apparatus. In methods employing optical dewpoint apparatus to obtain a readout of percent relative humidity, it is generally necessary to obtain separate readings of dewpoint and ambient temperatures and to combine the values of dewpoint temperature and ambient temperature to provide a readout of percent relative humidity. The dewpoint temperature is obtained by thermoelectrically cooling a mirror to a point at which a thin fog forms and sensing the fogging level using a lamp and photocell system which command cooling to maintain the fogging level. The temperature of the mirror at the fogging level is the dewpoint temperature. Separate temperature sensors are employed to measure the temperature of the mirror and the ambient temperature.

The dewpoint temperatures and the ambient temperatures Art must be combined in a non-linear functional relationship to arrive at the percent relative humidity. Such combination is cumbersome for manually taken point readings, and the use of a digital computer for performing such task automatically and continuously would be expensive.

A further disadvantage of taking separate readings for the dewpoint and ambient temperatures and later combining the readings is that the percent relative humidity is a function of the difference in the dewpoint and ambient temperatures. For example, at 90 percent relative humidity and an ambient temperature of 75°F, the relative humidity changes approximately 1 percent for a 0.3° F. change in this difference. Typical readout error for dewpoint devices presently available is approximately 0.5° F. Assuming a 0.1° F. error in reading the ambient temperature, there will be approximately a 2 percent error in the relative humidity determination under the above conditions.

Apparatus presently available for measuring relative humidity directly is characterized by problems of slow response speed, large hysteresis, and/or poor long term stability.

Accordingly, it would be desirable to have a simple and inexpensive measuring apparatus for sensing parameters, such as dewpoint and ambient temperatures of a given environment and for providing an output signal which varies linearly with changes in a condition such as percent relative humidity of the environment.

SUMMARY OF THE INVENTION

Therefore, it is an object of the present invention to provide an apparatus for measuring a condition of a given environment and for providing an output signal which varies linearly with changes in such condition.

The apparatus includes first and second sensing means which sense parameters within the environment and a computing circuit means controlled by the first and second sensing means to provide an output signal which varies linearly with changes in a condition of the environment.

In an exemplary embodiment, the measuring apparatus is employed in an application for measuring per cent relative humidity within a given environment. The computing circuit means includes first and second amplifier means, and the first and second sensing means comprise first and second temperature sensors which measure the dewpoint and the ambient temperatures, respectively, within the environment. The first amplifier means is responsive to an input signal supplied by the second amplifier means to provide an amplified output signal. The gain of the first amplifier means is controlled by the first and second temperature sensors such that the output signal is a function of percent relative humidity.

The output signal is fed back to an input of the second amplifier means, which receives a further input from a source of reference potential, such that the second amplifier means and the first amplifier means form a positive feedback loop which serves to linearize the output signal to compensate for non-linearity of the gain of the first amplifier means as a function of percent relative humidity.

In addition, first and second linearizing circuits associated with the first and second amplifier means, respectively, are selectively enabled to provide further shaping of the signals supplied to the first amplifier means and the second amplifier means to enable the computing circuit means to provide an output signal which varies linearly over a predetermined range with changes in relative humidity.

The first and second temperature sensors are connected in a common computing circuit means which can be adjusted to indicate a zero temperature difference when the temperature sensors are each at the same temperature. This enables individual sensor calibration errors to be substantially eliminated.

Also, both dewpoint and ambient temperature indications are supplied to the computing circuit means simultaneously enabling the computing circuit means to directly provide an output which is indicative of percent relative humidity.

Moreover, the measuring apparatus provided by the present invention is characterized by low readout errors, typically within ± 1 percent and low cost in comparison with known apparatus.

DESCRIPTION OF THE DRAWINGS

FIG. 3 is a schematic circuit diagram for a computing circuit of the measuring apparatus of FIG. 2; and FIG. 4 is a plot of values of output voltage VRH versus per cent relative humidity for the computing circuit shown in FIG. 3.

DESCRIPTION OF A PREFERRED EMBODIMENT

General Description

Figure 1:
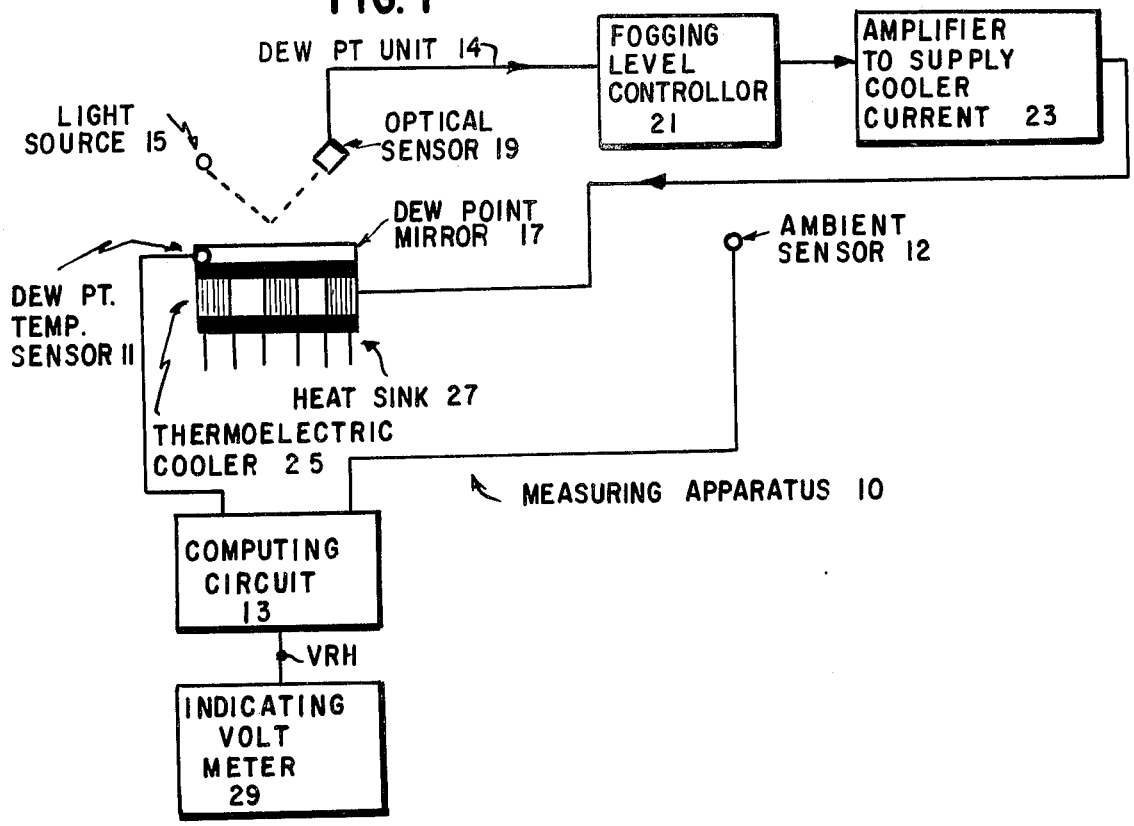
FIG. 1 is a simplified representation of a system for measuring and indicating percent humidity including a measuring apparatus provided by the present invention for measuring relative humidity within a given environment and a typical optical dewpoint apparatus which establishes the dewpoint temperature for the environment.

Referring to FIG. 1, there is shown a system including a measuring apparatus 10 of the present invention for measuring relative humidity within a given atmospheric environment and for providing an output voltage VRH which varies linearly with changes in the relative humidity.

The measuring apparatus 10 may, for example, be used as a portable instrument for precision measurement of percent relative humidity or to measure outside relative humidity for use in weather reporting or forecasting. Also, the apparatus may be used as the percent relative humidity sensor to be used in the closed loop control of percent relative humidity in a precision test chamber or in a laboratory or computer room environment where unusually precise control of percent relative humidity is desired. In such applications a readout could also be provided to monitor the percent relative humidity.

The apparatus 10 may also be used to measure percent relative humidity in gasses other than air. In addition, with certain modifications apparent to those skilled in the art, the apparatus may be employed to measure percent of saturation of condensable vapors other than water in special environments.

Referring to FIG. 1, the measuring apparatus 10 includes a pair of temperature sensors 11 and 12 which measure dewpoint and ambient temperatures, respectively, and provide control inputs to a computing circuit 13 which produces the output voltage VRH indicating the percent relative humidity. The output voltage may be extended to an indicating voltmeter 29.

The temperature sensors 11 and 12, embodied as a pair of matched thermistors RTA and RTB, are positioned to measure dewpoint and ambient temperatures, respectively, for the environment in which the percent relative humidity is being measured. One example of a thermistor suitable for this application is the YSI Type 44003 Precision Thermistor, commercially available from YSI-Components Division, Yellow Springs, Ohio.

Any means which will establish the dewpoint temperature to be sensed by the dewpoint sensing thermistor RTA may be used. In the preferred embodiment of FIG. 1, a dewpoint sensing unit 14 including an optically controlled thermoelectrically cooled dewpoint sensing mirror 17 is used to establish the dewpoint temperature. One example of a commercially available dewpoint unit suitable for this purpose is the Model 880, available from Cambridge Instruments. In the dewpoint unit 14, light from a light source 15 is reflected by a sensing mirror 17 onto a light level sensor 19. A thermoelectric cooler 25, which contacts the mirror 17, provides cooling of the mirror in accordance with a command signal supplied by a fogging level controller 21 over an associated amplifier 23. As the mirror 17 is cooled, a fog forms on the mirror 17, and the intensity of the light reading by the optical sensor 19 is reduced in proportion to the amount of moisture on the mirror 17. A fogging level controller 21 is adjusted to maintain a constant moderately heavy fogging level on the dewpoint mirror 17. It does so by providing a signal to the thermoelectric cooler 25 commanding more cooling as the light sensed by the light level sensor 19 increases indicating a thinner fog on the mirror. Likewise, the controller 21 commands less cooling as the light sensed by the light level sensor decreases indicating a thicker fog on the mirror.

Sample air from the environment to be measured is directed over the dewpoint mirror 17. A clean properly adjusted unit of the type described above will hold the mirror temperature within 1 or 2 tenths of a degree of the actual dewpoint temperature of the air.

The thermistor RTA is positioned in contact with the dewpoint mirror 17 to measure the dewpoint temperature of the environment as indicated by the temperature of the mirror 14. The resistance of the thermistor RTA varies as a function of the dewpoint temperature. The thermistor RTB is placed directly in the environment in which the percent relative humidity is being measured to measure its temperature. The resistance of RTB varies as a function of the ambient temperature only.

The resistance changes of the thermistors RTA and RTB effect a change in the output voltage VRH provided by the computing circuit 13 to indicate the relative humidity of the environment.

The percent relative humidity is very closely approximated by the following relationship:

$$(1) \quad \% RH = \frac{\text{Vapor Pressure of Water at TDP}}{\text{Vapor Pressure of Water at TAMB}} \times 100$$

where TDB is the dewpoint temperature and TAMB is the ambient temperature.

This definition is correct to the extent that the partial pressure of water in saturated air is equal to the vapor pressure of water at that temperature. The vapor pressure of water at absolute temperature T is closely approximated by the following equation:

$$(2) \quad V(T) = e^{(-a/T + b)}$$

where a and b are appropriate constants, and T is absolute temperature.

Accordingly, the percent relative humidity may be expressed as:

$$(3) \quad \% RH = \frac{V(TDP)}{V(TAMB)} = 100 \, e^{(a/TAMB - a/TDP)}$$

or $$(4) \quad \frac{\% RH}{100} = e^{(a/TAMB - a/TDP)}$$

Figure 2:
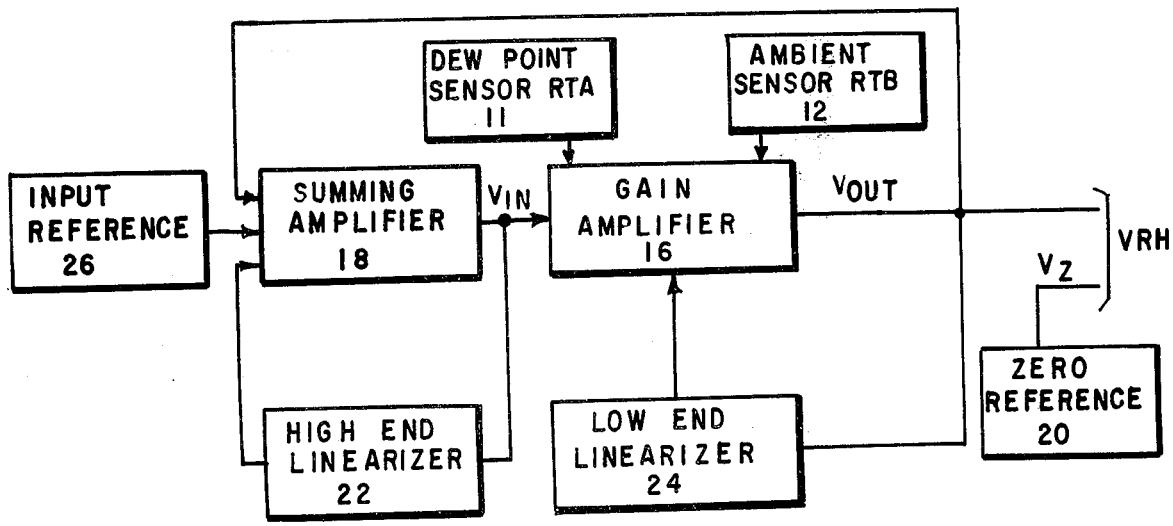
FIG. 2 is a functional block diagram of the measuring apparatus shown in FIG. 1.

In accordance with the present invention, the output signal VRH provided by the computer circuit 13 varies linearly with changes in percent relative humidity in the monitored environment. Referring to FIG. 2, there is shown a functional block diagram of the apparatus 10. The computer circuit 13 includes an amplifier circuit 16 which provides a gain function g(percent RH) which is a function of percent relative humidity. The amplifier circuit 16 is responsive to an input signal Vin supplied by a summing amplifier circuit 18 to provide an output signal Vout = g (percent RH) Vin. A zero reference circuit 20 supplies a reference signal Vz, which establishes a zero reference for the output signal VRH, such that the output signal VRH = Vout − Vz. An input reference circuit 26 establishes the range of the signal Vout.

The gain function g (percent RH) is varied in accordance with changes in resistance of the thermistors RTA and RTB which in turn vary in correspondence with changes in dewpoint and ambient temperatures. The thermistors RTA and RTB provide inputs to the gain function amplifier 16. Referring to FIG. 3, the gain function amplifier 16 includes an operational amplifier 30 having a gain determined by the ratio of thermistor RTB to thermistor RTA, or:

(5)    g (percent RH) = RTB/RTA

Referring again to FIG. 2, the input signal Vin is adjusted to compensate for the non-linearity of the gain function g(percent RH).

The gain function amplifier 16 and the summing amplifier 18 comprise a positive feedback loop having an open loop gain equal to K · g(percent RH). This feedback loop provides the primary linearization of g(percent RH). In addition, diode shaping circuits 22 and 24 provide linearization of the low and high ends of the transfer characteristic of the circuit 13.

Below it is shown that g(percent RH) can be made a function of percent relative humidity to the extent that equation (2) can approximate the actual vapor pressure verses temperature relation, and that equation (6) below can approximate the actual thermistor resistance verses temperature relation.

The resistances of thermistors RTA or RTB may be closely approximated by the equation:

(6)    $R(T) = e^{(c/T + d)}$ where $c$ and $d$ are appropriate constants and $T$ is absolute temperature.

From equation (5), the gain function g(percent RH) may then be expressed as:

(7)    $g(\% RH) = \dfrac{R(TAMB)}{R(TDP)}$ $= e^{c(1/TAMB - 1/TDP)}$ $= e^{\frac{c}{a}(a/TAMB - a/TDP)}$ By comparing equation (7) with equation (4) it is seen that:

(8)    $g(\% RH) = \left[\dfrac{(\% RH)}{100}\right]^{c/a}$

Equations (2) and (6) are approximating functions for the water vapor pressure and thermistor resistance, respectively. It is thus seen that equation (8) which is the desired result holds to the extent that equations (2) and (6) hold. The percent relative humidity is thus reduced from a function of both the ambient and dewpoint temperatures to a function of percent relative humidity alone. The computing circuit 13 linearizes this function so that the output is a linear function of percent relative humidity.

DETAILED DESCRIPTION

Referring to FIG. 3, there is shown a schematic circuit diagram of the computing circuit 13. The gain function g (percent RH) is provided by operational amplifier 30 and associated resistors R3, R4, R7, R8, R9, RTA, RTB and R21 which comprise the gain amplifier circuit 16 shown in FIG. 2. The operational amplifier 30 is connected in an inverting amplifier configuration.

The dewpoint temperature thermistor RTA is connected between an inverting input 31 of the amplifier 30 and the junction of resistors R3 and R4 which are serially connected between an input 32 of gain circuit 16 and ground. Resistors R7–R9 are serially connected between the output 34 of the amplifier 30 and ground.

The ambient temperature thermistor RTB is connected in a feedback loop between the junction of resistors R8 and R9 at the amplifier output 34 and the inverting input 31 of the amplifier 30. Resistors R3 and R4 and R7–R9 serve as voltage divider networks to reduce the voltage appearing across thermistors RTA and RTB to approximately 0.25 volts. The resistors R3, R4 and R7–R9 also add approximately 40 ohms effective series resistance to the thermistors RTA and RTB. Resistor R7 is a variable resistor used to trim the gain of the gain amplifier circuit 16 to unity for 100 percent relative humidity, or to trim the positive feedback loop gain, if necessary to achieve a desired output linearity.

Power is supplied to the operational amplifier 30 over positive and negative supply terminals 35 and 36 from voltage sources +V and −V, respectively. A potentiometer R21 provides adjustment to null the zero offset voltage between input terminals 31 and 33 of the amplifier 30.

The summing amplifier circuit 18 comprises a further operational amplifier 40 and resistors R1, R2, R19, R20, R22 and transistor Q1. The operational amplifier 40 is connected in a conventional inverting summing amplifier configuration. The operational amplifier 40 has a non-inverting input 41 connected to a summing point 42 for the amplifier. Inputs to the summing point 42 are provided over resistor R1, which is connected to the output of the operational amplifier 30, and from the input reference circuit 26 over series resistors R18 and R19. A further input is supplied by the high end linearization circuit 22 over a diode D1. Amplifier 40 has a non-inverting input 43 connected to ground.

The output of the summing amplifier circuit 18 at point 32 is connected over feedback resistor R2 to the inverting input 41 of the amplifier 40. The ratio R2/R1 sets the gain K for the summing amplifier circuit 18. Series connected resistors R18 and R19 are a summing input to amplifier 40 from the 6.4 volt reference voltage provided by reference circuit 26. Resistors R18 and R19 are connected in series between an input terminal 44 and the summing point 42. The input terminal 44 is connected to a 6.4 volt source. Resistor R18 is variable to permit adjustment of the range of the output voltage Vout. Reference circuit 26 consists of a 6.4 volt Zener diode Z1 connected between point 44 and ground. Current to supply the Zener diode Z1 is drawn from V+ through R23 which is connected between V+ and point 44. Point 44 is maintained at 6.4 volts by this circuit 26.

The output 45 of operational amplifier 40 is connected over resistor R22 to the base of transistor Q1. Transistor Q1 has its emitter connected to point 32 and its collector connected to the voltage source −V. Resistor R22 and transistor Q1 are connected in an emitter-follower configuration to increase the power output for the operational amplifier 40. Resistor R20 provides adjustment to null the zero offset voltage between the input terminals 41 and 43 of the operational amplifier 40.

Resistors R15–R17 and diode D1 comprise the high end linearization circuit 22. Resistors R15–R17 are serially connected between terminal 44 of the reference circuit 26 and the output of the summing circuit 18 at point 32. Resistor R16 is a variable potentiometer having a wiper 46 which connects to the cathode of diode D1. The anode of diode D1 is connected to the summing point 42 at the input of operational amplifier 40.

Diode D1 is biased into conduction when the measured relative humidity reaches approximately 70 percent relative humidity. Diode D1 serves to reduce the slope of Vout versus percent relative humidity curve for values of relative humidity greater than 70 percent. Resistor R16 provides adjustment of the break point position and slope change for the high end linearization circuit 22.

Resistors R12–R14 and diode D1 comprise the low end linearization circuit 24. Resistors R12–R14 are serially connected between voltage source −V and the output of operational amplifier 30. Resistor R13 is a potentiometer having a wiper 47 which is connected to the cathode of diode D2. The anode of diode D2 is connected to the junction of thermistor RTA and resistors R3 and R4 at the input of amplifier 30.

Diode D2 is biased into conduction whenever the measured value of relative humidity decreases below approximately 20 percent. Diode D2 serves to reduce the slope of the Vout versus percent relative humidity curve for values of relative humidity lower than 20 percent. Resistor R13 provides an adjustment of the break point position and slope change for the low end linearization circuit 22.

Resistors R10 and R11 comprise a voltage divider circuit 20 which supplies a zero reference voltage Vz to establish a zero reference for the output signal VRH provided by the computing circuit 13 such that VRH = Vout − Vz. Resistor R11 is adjustable to set the value of voltage Vz.

OPERATION OF THE COMPUTER CIRCUIT

When the relative humidity measuring apparatus 10 is properly adjusted, the computing circuit 13 provides an output voltage VRH which varies linearly from 1 to 10 volts as the relative humidity within the measured environment varies from 10 percent to 100 percent. In providing initial adjustment of the apparatus 10, the potentiometers R20 and R21 associated with operational amplifiers 40 and 30, respectively, are adjusted to null the input offset voltages for the operational amplifiers 30 and 40. Then, potentiometers R13 and R16 of the low and high end linearization circuits 22 and 24 are set to their counter clockwise positions.

Potentiometer R7 is then adjusted to provide unity gain inversion for amplifier circuit 16 from Vin to Vout for the condition where the resistance of thermistor RTA equals that of thermistor RTB, representing 100 percent relative humidity.

Potentiometer R18, of the input reference circuit 26, and potentiometer R11 of the zero reference circuit 20 are the iteratively adjusted so that the voltage VRH equals 7 volts for a desired reading of 70 percent relative humidity, and the voltage VRH equals 3 volts for a desired reading of 30 percent relative humidity.

Thereafter, potentiometer R16 is adjusted to provide an output voltage VRH equal to 10 volts for a desired reading of 100 percent relative humidity, and potentiometer R13 is adjusted to provide an output voltage VRH equal to 1 volt for a desired reading of 10 percent relative humidity.

Then the adjustment of resistors R18, R11, R16 and R13 in that order is repeated as instructed above until the reading is satisfactorily close at each value.

When adjusted in the manner described above, the computing circuit 13 provides an output voltage VRH representative of percent relative humidity of the environment to within ± 1 percent of the actual relative humidity for a given set of conditions. For example, such accuracy is obtained when the ambient temperature is within a range of 10°C to 60°C, the dewpoint temperature is greater than 0°C, and the relative humidity is greater than 10%. It is pointed out the above set of conditions is representative of the response obtained for the embodiment of the apparatus 10 described above, and such apparatus 10 is also operable for dewpoints below freezing and for wider ambient temperature ranges with reduced accuracy.

In a preferred application, the relative humidity measuring apparatus 10 is used to provide continuous measurement of the relative humidity within a given atmospheric environment. As shown in FIG. 1, dewpoint measurements are obtained through the use of a dewpoint thermistor RTA which varies in resistance in accordance with variation in the dewpoint temperature. The thermistor RTB, which measures the ambient temperature of the environment, varies in resistance in accordance with variations in the ambient temperature.

Variations in the resistance of either thermistor RTA or RTB effect a corresponding variation in the gain function g (percent RH) provided by the gain amplifier circuit 16 shown in FIG. 3. The input voltage Vin supplied to the gain amplifier circuit 16 by the summing amplifier circuit 18 is amplified, in accordance with the gain of the amplifier 16 established by thermistors RTA and RTB, to provide the output voltage Vout.

Assuming the relative humidity of the environment is initially 50 percent, then the gain of amplifier circuit 16 is −0.697. For such conditions, the summing circuit provides an input voltage Vin = −8.5 volts such that the difference between output voltage Vout and the zero reference voltage Vz is 5 volts.

A subsequent increase in the relative humidity to 60 percent, for example, as may be caused by a decrease in the ambient temperature, which causes an increase in the resistance RTB which causes an increase in the ratio of the resistances of thermistor RTA effecting a corresponding increase in the magnitude of the gain of amplifier circuit 16 to −0.777. Accordingly, the input voltage Vin, which is negative, is amplified by a negative gain of higher magnitude by gain amplifier circuit 16 such that the output voltage Vout, when referenced to the zero reference voltage Vz, provides an output voltage VRH that is equal to 6 volts.

Referring to FIG. 4, there is shown a curve which is representative of the transfer characteristic for the computing circuit 13 in terms of the output voltage VRH versus percent relative humidity. As can be seen in FIG. 4, the computing circuit 13 provides a linearly varying output voltage VRH for relative humidity between 10 percent and 100 percent.

The dotted portions A and B, of the characteristic shown in FIG. 4 represent the transfer function at the high and low ends respectively of the transfer characteristic of the computer circuit 13 with the high and low end linearization circuits disabled. The solid line shows the transfer function with the high and low end linearization circuits 22 and 24 adjusted properly. When the measured value of relative humidity increases to 70 percent, for example, diode D1 of the high end linearization circuit 24 is biased into conduction, causing the slope of the curve VRH versus percent RH to be reduced for values equal to or greater than 70percent relative humidity.

Similarly, when the measured value of relative humidity decreases to 20 percent, diode D2 of the low end linearization is biased into conduction to reduce the slope of the curve VRH versus percent RH for values equal to or less than 20 percent relative humidity.

I claim:

1. In a system for monitoring a condition of a given environment, a measuring apparatus comprising first sensing means for sensing a first parameter of the environment, second sensing means for sensing a second parameter of the environment, first amplifier means, input means for providing an input signal to said first amplifier means to enable said first amplifier means to provide an amplified output signal, said first and second sensing means being operable to control the gain of said first amplifier means whereby said output signal varies linearly with changes in the condition being monitored, said input means including second amplifier means for summing said output signal with a reference signal to provide said input signal for said first amplifier means.

2. A system as set forth in claim 1 wherein said first and second sensing means comprise first and second variable resistance devices having non-linear resistance characteristics, said first resistance device being connected to an input of said first amplifier means and said second resistance device being connected in a feedback path between an output of said first amplifier means and an input of said first amplifier means whereby the gain of said first amplifier means is determined by the ratio of the resistances of said second and first resistance devices.

3. A system as set forth in claim 1 wherein said first and second sensing means comprise first and second variable resistance devices, the resistances of said first and second resistance devices varying non-linearly with changes in said first and second parameters, respectively, and wherein said first amplifier means and said second amplifier means are connected in a positive feedback loop to linearize the gain of said first amplifier means.

4. In a system for measuring relative humidity within a given environment which is subject to variations in dewpoint and ambient temperatures, a measuring apparatus comprising first temperature sensing means for sensing the dewpoint temperature within said environment, second temperature sensing means for sensing the ambient temperature within said environment, first amplifier means, input means for providing an input signal to said first amplifier means, said first amplifier means being responsive to said input signal to provide an amplified output signal, said first and second temperature sensing means being operable to control the gain of said first amplifier means whereby said amplified output signal varies linearly with changes in the relative humidity of said environment, said input means including second amplifier means having an input and means for summing said output signal with a reference signal at said input to enable said second amplifier means to provide said input signal for said first amplifier means at an output of said second amplifier means which is connected to an input of said first amplifier means.

5. A system as set forth in claim 4 wherein said first and second temperature sensing means comprise first and second thermistor means.

6. A system as set forth in claim 5 wherein said first thermistor means is connected to said input of said first amplifier means and said second thermistor means is connected in a feedback loop between an output of said first amplifier means and said input of said first amplifier means whereby the gain of the first amplifier means is determined by the ratio of said second and first thermistor means.

7. A system as set forth in claim 6 wherein the resistances of said first and second thermistor means vary non-linearly with changes in said dewpoint and ambient temperatures, said first and second amplifier means being commected in a positive feedback loop to linearize the gain of said first amplifier means.

8. A system as set forth in claim 7 which includes first linearizing means connected between said input and said output of said first amplifier means, said first linearizing means being enabled whenever said input signal reaches a predetermined level to limit said input signal to thereby linearize the low end of the transfer characteristic for the measuring apparatus.

9. A system as set forth in claim 8 which includes second linearizing means connected between said input of said second amplifier means and said output of said second amplifier means, said second linearizing means being enabled whenever said output signal reaches a predetermined level to limit said output signal to thereby linearize the high end of the transfer characteristic for the measuring apparatus.

10. A system as set forth in claim 7 which includes means for adjusting the open loop gain of said positive feedback loop.

11. In a system for measuring relative humidity within a given environment which is subject to variations in dewpoint and ambient temperatures, a measuring apparatus comprising first and second amplifier means connected in a positive feedback loop with the output of said first amplifier means being connected to an input of said second amplifier means, and the output of said second amplifier means being connected to an input of said first amplifier means, said second amplifier means supplying an input signal to said first amplifier means, to enable said first amplifier means to provide an amplified signal at an output thereof which is extended to said input of said second amplifier means, and control means for controlling the gain of said first amplifier means in accordance with variations in the relative humidity of said environment to enable the output signal provided by said first amplifier means to vary linearly with changes in the relative humidity of said environment.

12. A system as set forth in claim 11 wherein said control means comprises first and second temperature sensing means for sensing ambient and dewpoint temperatures, respectively of said environment.

13. A system as set forth in claim 12 wherein said first and second temperature sensing means comprise first and second thermistors, respectively.

14. In a system for measuring relative humidity within a given environment which is subject to changes in ambient and dewpoint temperatures, a measuring apparatus comprising first and second resistive temperature sensing means for sensing the dewpoint and ambient temperatures, respectively of said environment, first and second amplifier means connected together in a positive feedback loop, first means connecting an output of said first amplifier means to an input of said second amplifier means, and second means, including said first temperature sensing means, connecting an output of said second amplifier means to an input of said first amplifier means, said second amplifier means providing an input signal for said first amplifier means to enable said first amplifier means to provide an amplified output signal at said output which is extended over said first means to said input of said second amplifier means, said second temperature sensing means being connected between said output and said input of said first amplifier means whereby the gain of said first amplifier means is determined by said second and first temperature sensing means, the resistances of said first and second temperature sensing means varying in accordance with variations in the dewpoint and ambient temperatures, respectively of said environment to cause a variation in the gain of said second amplifier means whereby the output signal provided by said second amplifier means varies linearly with changes in the relative humidity of said environment.

15. In a system for measuring relative humidity within a given environment which is subject to changes in ambient and dewpoint temperatures, a measuring apparatus comprising first and second resistive temperature sensing means for sensing the dewpoint and ambient temperatures, respectively of said environment, first and second amplifier means connected together in a positive feedback loop, said first amplifier means providing an input signal for said second amplifier means to enable said second amplifier means to provide an amplified output signal at an output thereof which is connected to an input of said first amplifier means, reference means for extending a reference signal to said input of said first amplifier means and means for adjusting said reference signal to establish an output range for said output signal, said first temperature sensing means being connected between an output of said first amplifier means and an input of said second amplifier means, and said second temperature sensing means being connected between said output and said input of said second amplifier means whereby the gain of said second amplifier means is determined by said second and first temperature sensing means, the resistances of said first and second temperature sensing means varying in accordance with variations in the dewpoint and ambient temperatures, respectively of said environment to cause a variation in the gain of said second amplifier means whereby the output signal provided by said second amplifier means varies linearly with changes in the relative humidity of said environment.

16. In a system for measuring relative humidity within a given environment which is subject to changes in ambient and dewpoint temperatures, a measuring apparatus comprising first and second resistive temperature sensing means for sensing the dewpoint and ambient temperatures, respectively of said environment, first and second amplifier means connected together in a positive feedback loop, said first amplifier means providing an input signal for said second amplifier means to enable said second amplifier means to provide an amplified output signal at an output thereof which is connected to an input of said first amplifier means, said first temperature sensing means being connected between an output of said first amplifier means and an input of said second amplifier means, and said second temperature sensing means being connected between said output and said input of said second amplifier means whereby the gain of said second amplifier means is determined by said second and first temperature sensing means, the resistances of said first and second temperature sensing means varying in accordance with variations in the dewpoint and ambient temperatures, respectively of said environment to cause a variation in the gain of said second amplifier means whereby the output signal provided by said second amplifier means varies linearly with changes in the relative humidity of said environment, and reference means for establishing a zero reference for said output signal.

* * * * *